United States Patent [19]

Yamamura

[11] Patent Number: 5,705,755
[45] Date of Patent: Jan. 6, 1998

[54] DEVICE FOR DETECTING POSITION AND LOAD OF A MOVING OBJECT

[75] Inventor: Kengo Yamamura, Shizuoka-ken, Japan

[73] Assignee: Asmo Co., Ltd., Shizuoka-ken, Japan

[21] Appl. No.: 516,922

[22] Filed: Aug. 18, 1995

[30] Foreign Application Priority Data

Aug. 18, 1994 [JP] Japan ..................... 6-194193

[51] Int. Cl.[6] .................................... G01L 3/02
[52] U.S. Cl. ................... 73/862.191; 73/862.324
[58] Field of Search ............... 73/862.541, 862.324, 73/862.325, 862.191, 862.624

[56] References Cited

U.S. PATENT DOCUMENTS

| | | | |
|---|---|---|---|
| 3,845,479 | 10/1974 | Fabry | 73/862.191 |
| 3,888,116 | 6/1975 | Spinella | 73/862.324 |
| 3,940,979 | 3/1976 | Ward et al. | 73/862.324 |
| 4,433,585 | 2/1984 | Levine | 73/862.324 |
| 4,627,297 | 12/1986 | Akimoto | 73/862.324 |

FOREIGN PATENT DOCUMENTS

| | | |
|---|---|---|
| 59-148586 | 8/1984 | Japan. |
| 1522523 | 8/1978 | United Kingdom. |

*Primary Examiner*—Elizabeth L. Dougherty
*Attorney, Agent, or Firm*—Hazel & Thomas

[57] ABSTRACT

A device for detecting position and load of a moving object detects with a high degree of precision a position of a window glass of a power window apparatus or the like and load of a motor, and conducts the detection with a simple structure at a low cost. The device for detecting position and load has a pulse plate which rotates together with a motor output shaft. A sliding contact abuts the pulse plate. As the pulse plate rotates, a predetermined pulse is detected, and a rotational position, a rotational direction, and a rotational speed of the motor output shaft can be detected. Accordingly, a position of movement and a load (catching of a foreign object by the window glass or the like) of the motor output shaft, and therefore of the window glass, can be detected accurately at all times without any adverse effects from thrust joggle of the armature or a rubber cushion or the like.

23 Claims, 13 Drawing Sheets

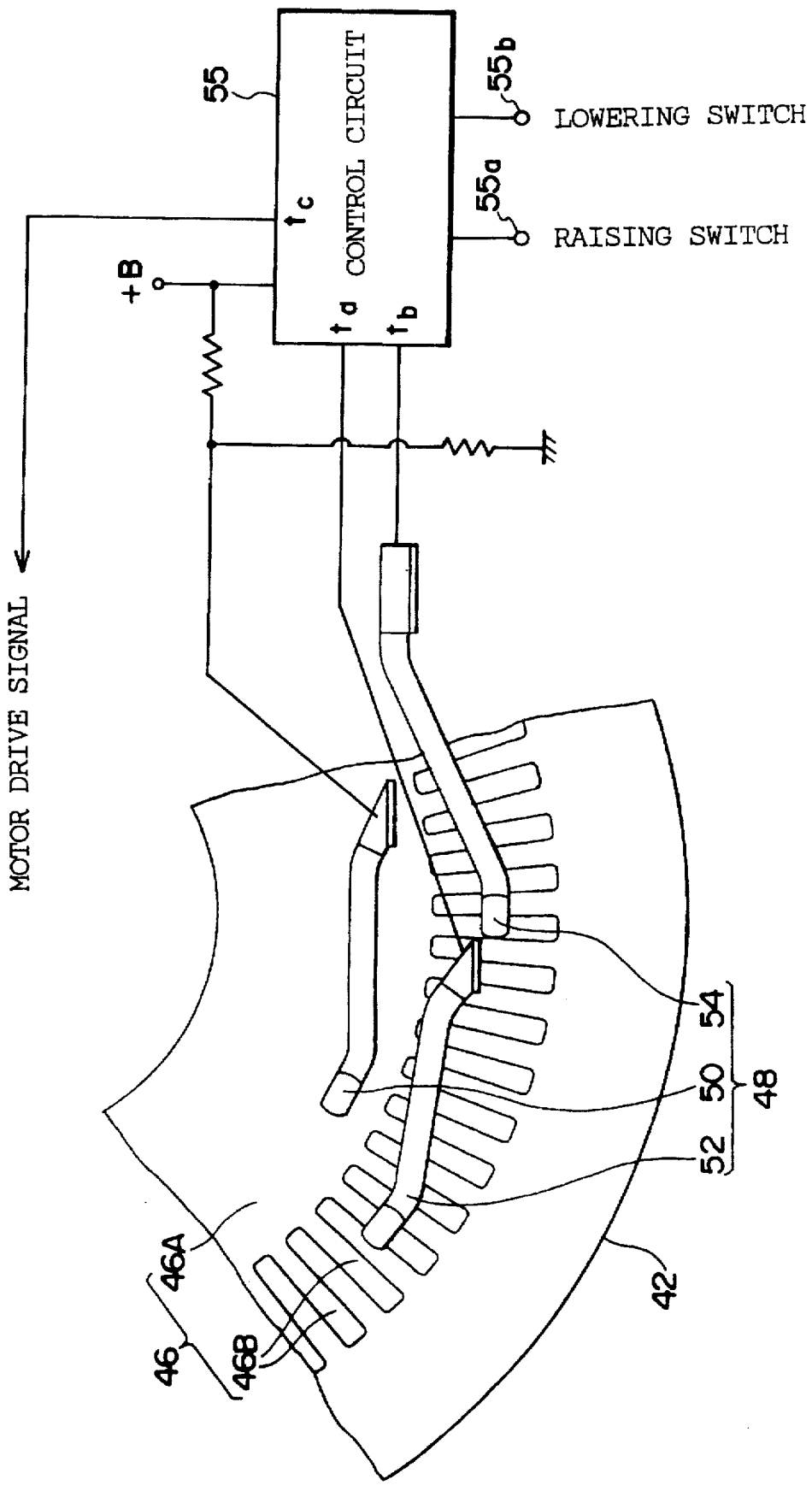

DEVICE FOR DETECTING POSITION AND LOAD OF A MOVING OBJECT

BACKGROUND OF THE INVENTION

1. Field of the Invention

The present invention relates to a device for detecting position and load of a moving object, which device is used in a power window apparatus in which a window glass of a vehicle door is moved so as to be opened and closed, or in a sunroof apparatus in which a sunroof is moved so as to be opened and closed, or in a similar apparatus.

2. Description of the Related Art

A motor, which serves as a drive source and in which a decelerating mechanism is integrated, is used in, for example, a power window apparatus for moving a window glass of a vehicle up and down so as to close and open the window glass, or in a sunroof apparatus which opens and closes a sunroof.

There exist power window apparatuses having a so-called catch preventing function which prevents foreign objects or parts of a vehicle occupant's body from inadvertently becoming caught between the window glass and the window frame. A power window apparatus equipped with such a catch preventing function may be structured in the following manner. A limit switch is disposed at a predetermined position of the door. On the basis of a signal from the limit switch and the lock current of the motor, it is determined whether a foreign object has become caught between the window glass and the window frame, and the movement of the window glass, i.e., the rotational position of the motor, is controlled. There also exist power window apparatuses equipped with a catch preventing function which are structured as follows. The rotational frequency of the armature is detected by providing a Hall IC or a special commutator. On the basis of a rotational frequency detecting signal, a determination is made as to whether a foreign object is caught, and the rotational position of the motor is controlled.

Such conventional power window apparatuses (mechanisms detecting the rotational position of the motor) have a drawback in that their precision of detecting the position of movement of the window glass (the rotational position of the motor) is unsatisfactory.

Specifically, in an apparatus in which the catch preventing mechanism is based on the signal from the limit switch disposed at the door and the lock current of the motor, when the motor and the window regulator are assembled in a vehicle body, even if the motor and the window regulator are assembled in the vehicle body with a vertical position of the window glass and a predetermined rotational position of the motor rotating shaft being made to correspond, and even if the limit switch is mounted to an optimal position corresponding to a predetermined position of the window glass, the accuracy of detecting the position of the window glass deteriorates when the window glass joggles due to subsequent operation. Accordingly, readjustment must be carried out each time the accuracy of detection deteriorates. Further, in an apparatus in which the catch preventing mechanism is based on the rotational frequency detecting signal of the armature from a Hall IC or a special commutator, due to the thrust joggle (axial direction joggle) of the armature and/or the existence of a rubber cushion of the deceleration mechanism or the like, the rotational frequency of the armature (the detection signal thereof) and the position of movement of the window glass do not always correspond exactly, and as a result, the accuracy of detecting the position of the window glass deteriorates. Accordingly, in this case as well, the positional relationship between the window glass and the motor rotating shaft must be reset and corrected, or otherwise, control of the movement of the window glass becomes difficult.

Further, in a conventional power window apparatus (a mechanism for detecting the rotational position of the motor), the catching of a foreign object (a predetermined load) is detected by the motor lock current. Errors in the motor lock current with respect to temperature are large. As a result, in a structure in which a determination (load detection) as to whether a part of a vehicle occupant's body or another foreign object is caught between the window glass and the window frame is based solely on the motor lock current, a drawback arises in that accurate control is difficult in cases in which the temperature conditions vary.

As described above, precision is poor and accurate control is difficult in conventional mechanisms which detect the rotational position and the load of a motor used in a power window apparatus, a sunroof apparatus or the like.

SUMMARY OF THE INVENTION

In view of the aforementioned, an object of the present invention is to provide a device for the detecting position and load of a moving object which can detect with a high degree of accuracy the position of a window glass or a sunroof and the load of a motor when used in a power window apparatus or a sunroof apparatus, and which can realize such detection with a simple structure and at a low cost.

Accordingly, the present invention provides a device for detecting position and load of a moving object, for detecting a position of movement of a moving object which moves in forward and reverse directions and for detecting a load applied to the moving object, the device comprising: a pulse generator connected to the moving object and always generating pulses in connection with movement of the moving object; a pulse detector detecting the pulses generated by the pulse generator; and a control circuit detecting, on the basis of the pulses generated by the pulse generator, the position of movement of the moving object and the load applied to the moving object.

In a first aspect of the above-described device for detecting position and load of a moving object, the moving object may be an output shaft of a motor which rotates in forward and reverse directions, and the pulse generator may be a disk-shaped pulse plate which rotates together with the output shaft and at which recessed and protruding conductive portions are provided continuously at predetermined intervals. The pulse detector may be a sliding contact which is disposed so as to correspond to the conductive portions of the pulse plate and which contacts the conductive portions.

In a second aspect of the above-described device for detecting position and load of a moving object, the moving object may be an output shaft of a motor which rotates in forward and reverse directions, and the pulse generator may be a disk-shaped pulse plate which rotates together with the output shaft and at which light reflecting portions are provided continuously at predetermined intervals. The pulse detector may be a light sensor which is disposed so as to correspond to the light reflecting portions of the pulse plate and which detects light reflected from the light reflecting portions.

In the device for detecting position and load of a moving object, when the moving object moves in the forward or reverse direction, the pulse generator generates pulses in connection with the movement of the moving object, and the generated pulses are detected by the pulse detector. On the basis of the detected pulse signals (the number of pulses, the pulse width, or the duty factor), the control circuit can linearly detect the position of movement of the moving object and the moving speed thereof.

For example, if the device for detecting position and load is used in a motor for driving a vehicle power window apparatus equipped with a catch preventing function, the rotational position of the motor rotating shaft (i.e., the position of movement of the window glass) can accurately be detected at all times. Further, the load applied to the motor (i.e., whether a foreign object has become caught between the window glass and the window frame, or whether the window glass has reached a limit of movement) can accurately be detected at all times.

In the first aspect of the device for detecting position and load of a moving object, when the motor rotates in the forward or reverse direction, the pulse plate rotates in connection with the motor. In this way, while the contact position of the sliding contact which contacts the conductive portions of the pulse plate changes, pulses are generated and are detected. On the basis of the detected pulse signals (the number of pulses, the pulse width, or the duty factor), the rotational position of the motor and the rotational speed thereof can be detected linearly.

For example, it the device for detecting position and load is used in a motor for driving a vehicle power window apparatus equipped with a catch preventing function, the rotational position of the motor rotating shaft (i.e., the position of movement of the window glass) can accurately be detected at all times. Further, the load applied to the motor (i.e., whether a foreign object has become caught between the window glass and the window frame, or whether the window glass has reached a limit of movement) can accurately be detected at all times.

In the second aspect of the device for detecting position and load of a moving object, when the motor rotates in the forward or reverse direction, the pulse plate rotates in connection with the motor. In this way, while the opposing position of the light sensor and the light reflecting portions of the pulse plate changes, pulses are generated and are detected. On the basis of the detected pulse signals (the number of pulses, the pulse width, or the duty factor), the rotational position of the motor and the rotational speed thereof can be detected linearly.

For example, if the device for detecting position and load is used in a motor for driving a vehicle power window apparatus equipped with a catch preventing function, the rotational position of the motor rotating shaft (i.e., the position of movement of the window glass) can accurately be detected at all times. Further, the load applied to the motor (i.e., whether a foreign object has become caught between the window glass and the window frame, or whether the window glass has reached a limit of movement) can accurately be detected at all times.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 5A is a plan view illustrating a corresponding relationship between a sliding contact and a conductive portion of the device for detecting position and load relating to the first embodiment.

DESCRIPTION OF THE PREFERRED EMBODIMENTS

Figure 1:
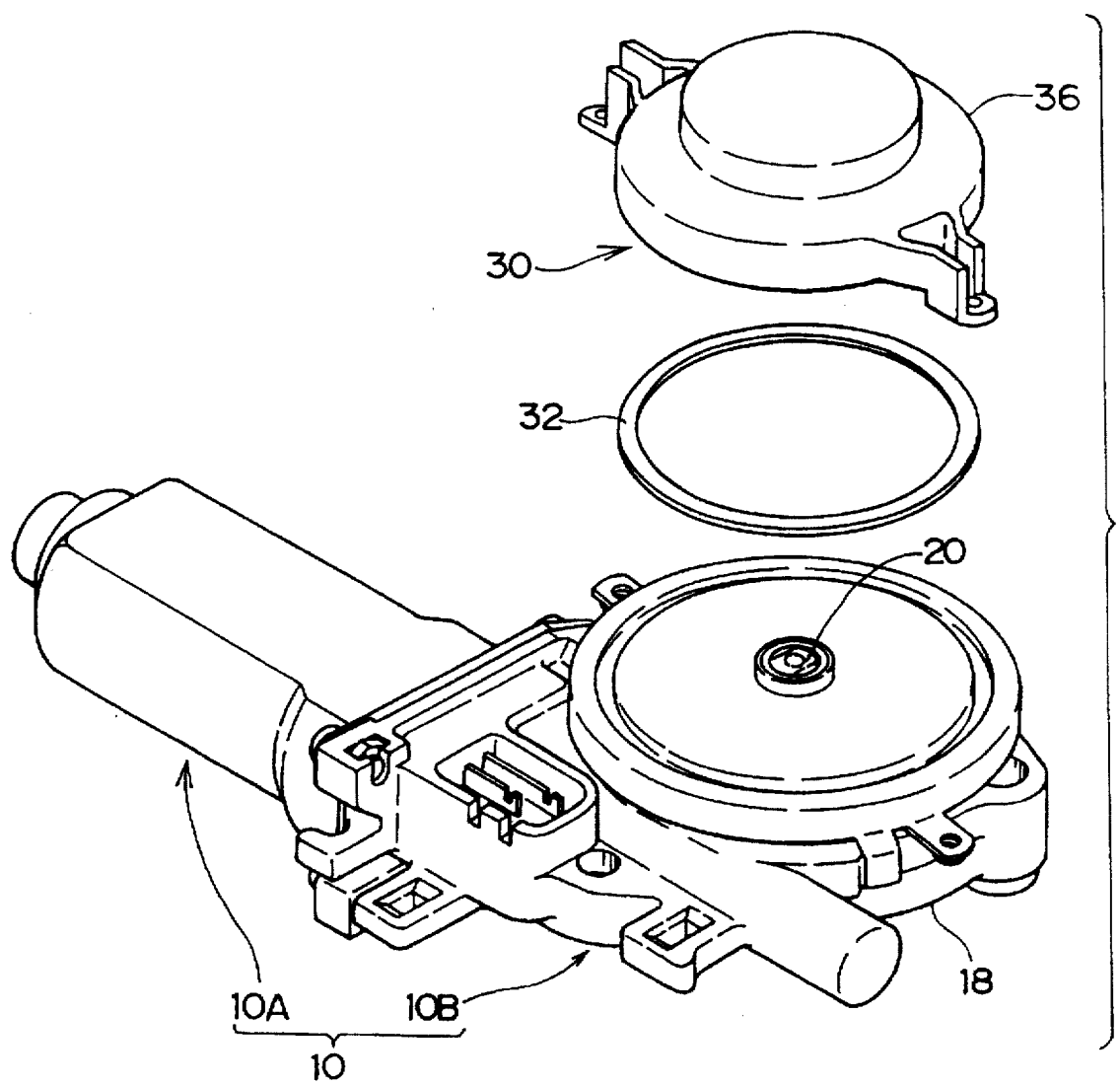
FIG. 1 is an overall perspective view of a motor of a power window apparatus to which a device for detecting position and load relating to a first embodiment of the present invention is applied.
Figure 2:
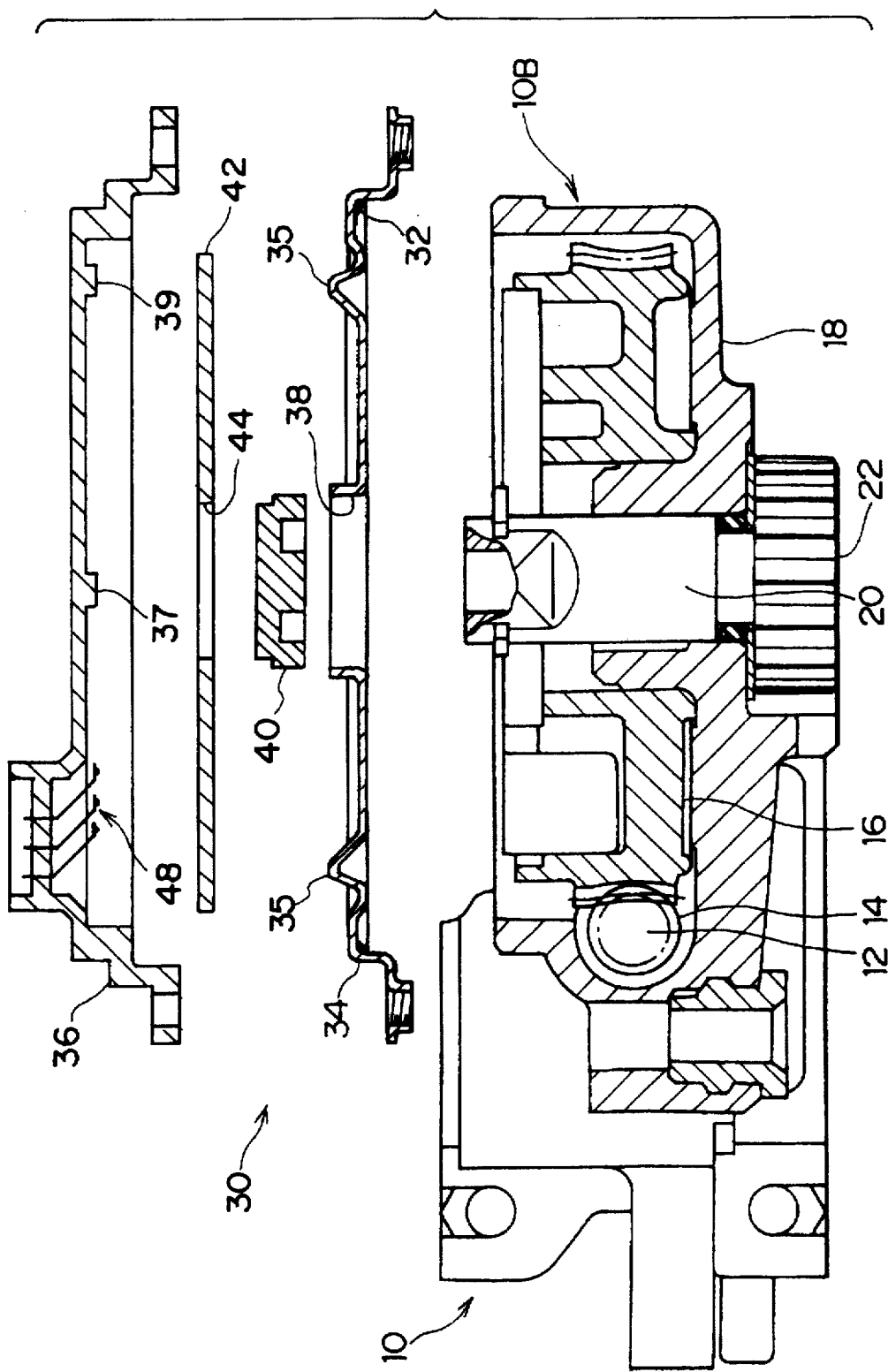
FIG. 2 is an exploded cross-sectional view taken along line 3—3 of FIG. 4 of the motor of the power window apparatus to which the device for detecting position and load relating to the first embodiment of the present invention is applied.
Figure 3:
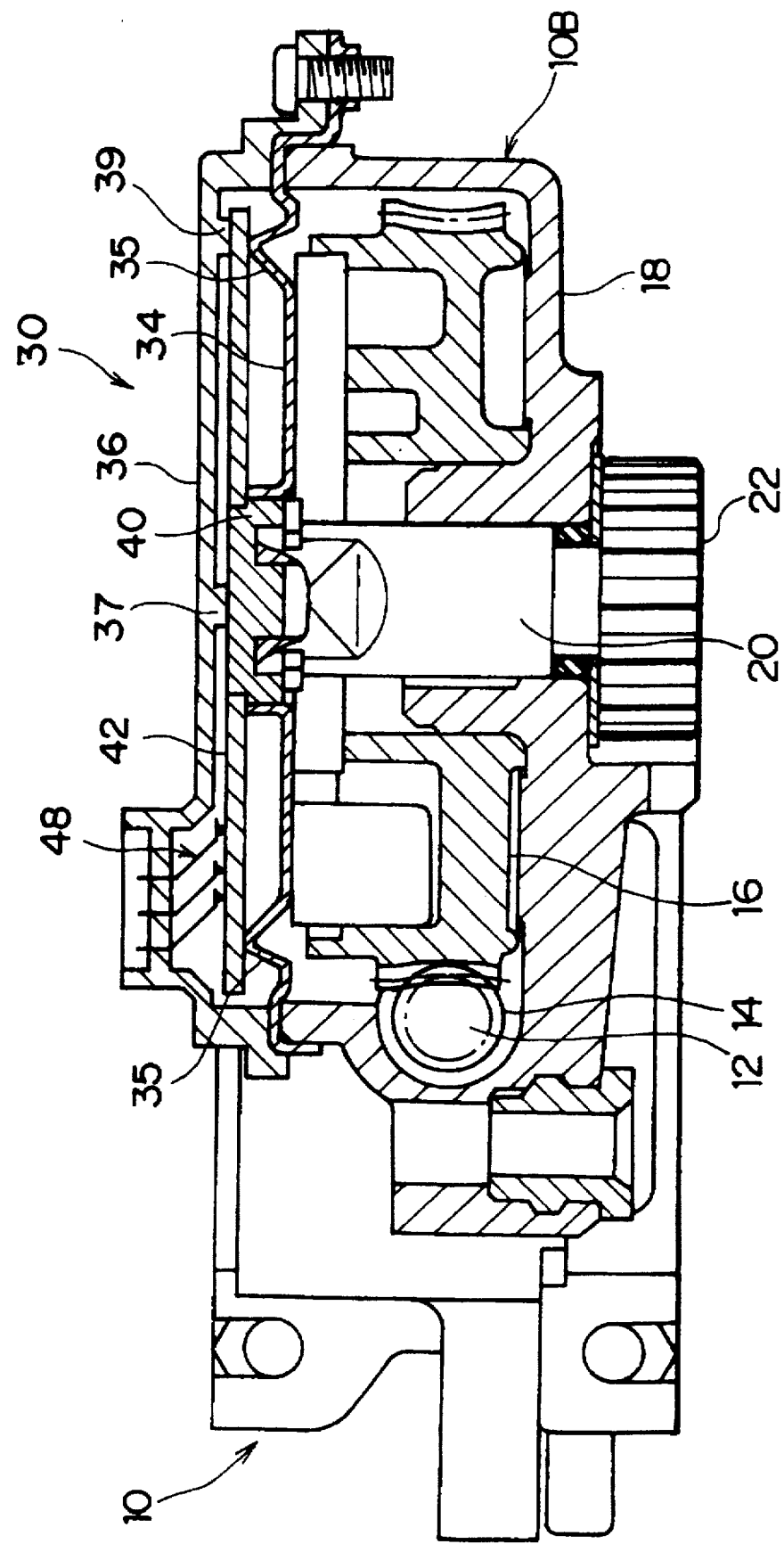
FIG. 3 is a cross-sectional view taken along line 3—3 of FIG. 4 of the motor of the power window apparatus to which the device for detecting position and load relating the first embodiment of the present invention is applied.
Figure 4:
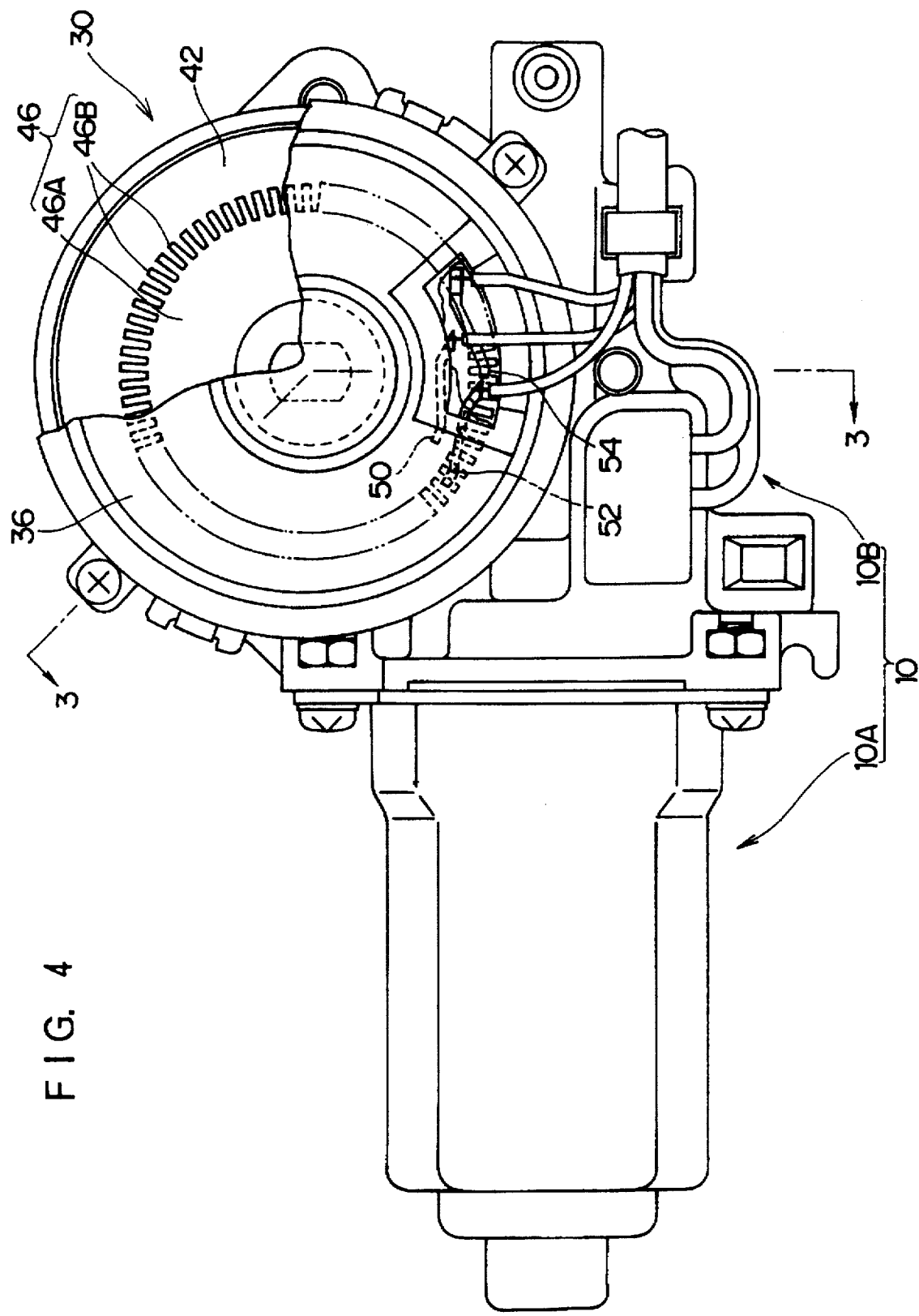
FIG. 4 is a partially-broken plan view of the motor of the power window apparatus to which the device for detecting position and load relating to the first embodiment of the present invention is applied.

FIG. 1 is an overall perspective view of a motor 10 of a power window apparatus to which a device 30 for detecting position and load relating to a first embodiment of the present invention is applied. FIGS. 2 and 3 are cross-sectional views of the motor 10 and the device 30 for detecting position and load, and FIG. 4 is a partially-broken plan view of the device 30 for detecting position and load.

The motor 10 is formed by a motor portion 10A and a gear portion 10B which is connected to the motor portion 10A. A rotating shaft 12 of the motor portion 10A extends to the interior of the gear portion 10B, and a worm gear 14 is formed at the distal end of the rotating shaft 12. The worm gear 14 meshes with a rotating gear wheel 16 disposed within the gear portion 10B.

A shaft 20, serving as a motor output shaft, of the rotating gear wheel 16 is rotatably supported at a cover 18 of the gear portion 10B. When the motor portion 10A is operated and the rotating shaft 12 rotates, the rotational force thereof is transmitted to the rotating gear wheel 16 via the worm gear 14, so that the shaft 20 rotates. A pinion 22 is attached to the distal end of the shaft 20 and meshes with the rack (unillustrated) of a window regulator.

The device 30 for detecting position and load is attached, via a gasket 32, to the surface at the opposite side of the pinion 22 of the shaft 20 of the rotating gear wheel 16.

As shown in detail in FIGS. 2 and 3, the device 30 for detecting position and load is equipped with a base plate 34 and a cover plate 36, and is structured as a thin, substantially cylindrical shape by the plates 34, 36. A through-hole 38 is formed in the central portion of the base plate 34.

The device 30 for detecting position and load includes a pulse plate 42 serving as a pulse generating means. As illustrated in FIG. 4, the pulse plate 42 is formed as a circular plate, and is disposed between the base plate 34 and the cover plate 36. Projections 35, 37, 39 are formed at the inner sides of the base plate 34 and the cover plate 36. Movement of the pulse plate 42 in the axial direction is restricted by the protrusions 35, 39. Movement of a metal ring 40 in the axial direction is restricted by the projection 37. Therefore, the pulse plate 42 can rotate stably without any shaking in the axial direction. An engaging hole 44 having a step portion at the inner periphery thereof is formed in the central portion of the pulse plate 42. A step portion is formed in each axial direction side of the metal ring 40. Respective step portions at respective sides of the metal ring 40 fit with the pulse plate 42 and the shaft 20, so that the pulse plate 42 and the shaft 20 do not move relatively to each other. Accordingly, after the pulse plate 42 has been assembled, it is connected integrally to the shaft 20 of the rotating gear wheel 16. In this way, the pulse plate 42 always rotates integrally with the shaft 20. Further, a conductive portion 46 is provided at the surface of the pulse plate 42 at the cover plate 36 side. The conductive portion 46 is provided at the central portion of the pulse plate 42. As shown in detail in FIG. 5A, the conductive portion 46 is formed by a ring-shaped first conductive portion 46A and a second conductive portion 46B which is adjacent to the first conductive portion 46A and which includes continuous pulse-shaped recesses and protrusions.

A sliding contact 48 serving as a pulse detecting means is provided at the cover plate 36. As illustrated in FIG. 5A, the sliding contact 48 is formed by an input contact plate 50 and by a pair of output contact plates 52, 54. The input contact plate 50 and the output contact plates 52, 54 are all elastic. Respective ones of ends of the input contact plate 50 and the pair of output contact plates 52, 54 are fixed to the cover plate 36. Respective distal ends of the contact plates 50, 52, 54 extend toward the pulse plate 42, and elastically abut the conductive portion 46. The input contact plate 50 always contacts the first conductive portion 46A of the conductive portion 46, and the pair of output contact plates 52, 54 contact the second conductive portion 46B of the conductive portion 46. In this way, as the pulse plate 42 rotates, a series of pulse signals can be detected by the repetition of the contacting/non-contacting state of the output contact plate 52 and the second conductive portion 46B. Further, a series of pulse signals can be detected by the repetition of the contacting/non-contacting state of the output contact plate 54 and the second conductive portion 46B.

Figure 6:
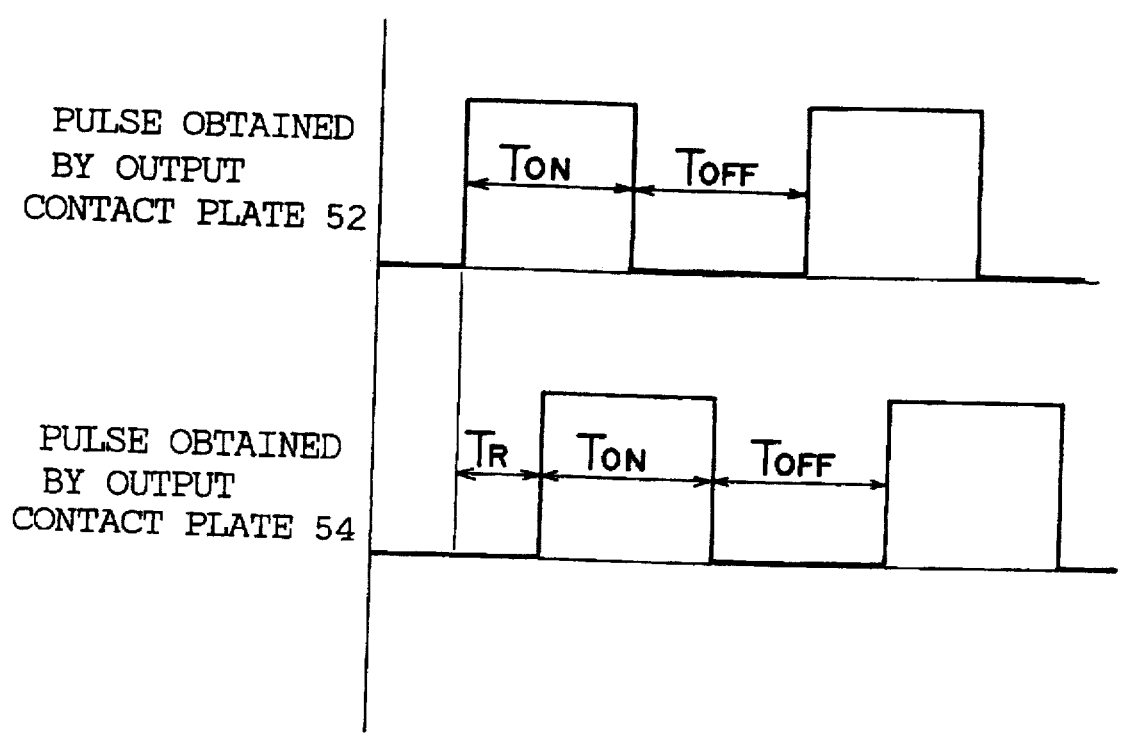
FIG. 6 is s diagram illustrating pulses detected by the device for detecting position and load relating to the first embodiment of the present invention.

In the first embodiment, the number of recesses and protrusions of the second conductive portion 46B is set so that 70 pulses are obtained by one rotation of the pulse plate 42. As illustrated in FIG. 6, the pulse width $T_{ON}$=6 ms and $T_{OFF}$=6 ms. In this case, the contact positions of the output contact plates 52, 54 and the second conductive portion 46B are set to be offset such that the phase difference between the pulse signal obtained by the output contact plate 52 and the pulse signal obtained by the output contact plate 54 is offset by ¼ of a cycle ($T_R$=3 ms). In this way, the rotational direction (forward rotation or reverse rotation) of the pulse plate 42 (i.e., the shaft 20) can be detected. If the phase difference between the pulse signals of the output contact plates 52, 54 is other than ½ of a cycle, the rotational direction can be detected. Therefore, the phase difference can be any cycle other than ½ of a cycle.

The sliding contact 48 (the input contact plate 50 and the pair of output contact plates 52, 54) is electrically connected to a control circuit 55 of the power window apparatus as shown in FIG. 5A, to be used for rotational control of the motor 10.

Figure 5B:
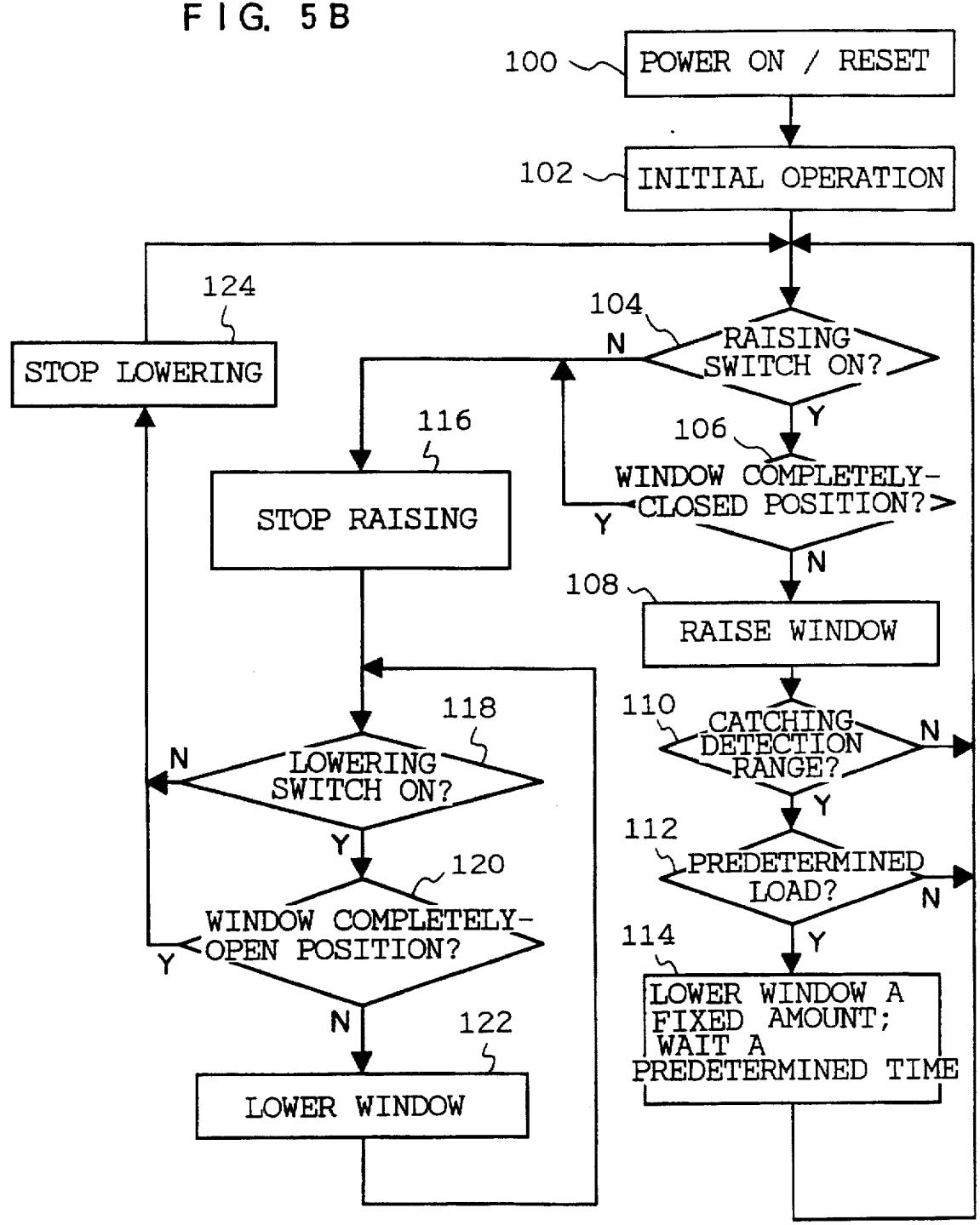
FIG. 5B is a flowchart explaining operation of a control circuit illustrated in FIG. 5A.

Next, operation of the present embodiment will be described with reference to the flowchart of FIG. 5B.

In the initial operation (step 102) after the power source has been turned on (step 100), the motor 10 is operated by the motor drive signal from a terminal tc of a control circuit 55, and the shaft 20 is rotated. The window regulator is thereby operated, and the window glass is completely opened or completely closed. The completely-opened position and the completely-closed position, i.e., the window bottom end stop position and the window top end stop position, are stored on the basis of the pulse signals from the output contact plates 52, 54. Further, a catching detection range in which catching of a foreign object may be detected (e.g., a range between the window bottom end stop position and a position 4 mm beneath the window top end stop position) is also determined and stored on the basis of the pulse signals.

Next, explanation will be given of a case in which a raising switch 55a of the power window apparatus is operated, and the window glass is raised.

At the motor 10 and the device 30 for detecting position and load which have the above-described structures, when the raising switch 55a of the power window apparatus is operated (step 104), the motor 10 is operated, and the shaft 20 rotates. The window regulator is thereby operated, and the window glass is raised (step 108). Here, as the shaft 20 rotates, the pulse plate 42 of the device 30 for detecting position and load rotates. A series of pulse signals generated by the input contact plate 50 and the output contact plate 52 is detected by a terminal ta of the control circuit 55, and a series of pulse signals generated by the input contact plate 50 and the output contact plate 54 is detected by a terminal to of the control circuit 55.

Due to these detected pulse signals, a determination is made (step 110) from the counted number of pulses as to whether a predetermined rotational position of the motor 10 has been reached, i.e., whether the window glass has reached the upper limit position of the catching detection range (e.g., a position 4 mm beneath the top end stop position).

If the window glass has not reached a position 4 mm beneath the top end stop position ("Y" in step 110), while the operation of the motor 10 is continued, a determination is made as to whether a foreign object has become caught (step 112) on the basis of the pulse signals (pulse width: period) detected in the same way by the device 30 for detecting position and load. When the catching of a foreign object is detected ("Y" in step 112), the motor 10 is rotated reversely, and the window glass is lowered (step 114).

On the other hand, when it is determined, on the basis of the pulse signals (number of pulses) detected by the device 30 for detecting position and load, that the window glass has reached a position 4 mm beneath the top end stop position ("N" in step 110), while the operation of the motor 10 is continued, a determination is made as to whether the window glass is completely closed (step 106) on the basis of the pulse signals (pulse width: period) detected in the same way by the device 30 for detecting position and load. When complete closure of the window glass is detected, the motor 10 is stopped (step 116).

Next, description will be given of a case in which a lowering switch 55b of the power window apparatus is operated ("Y" in step 118) and the window glass is lowered. The lowering operation is continued until the window reaches the completely open position (step 122). When complete opening of the window glass is detected on the basis of the pulse signals ("Y" in step 120), the motor 10 is stopped, and the lowering of the window glass is stopped (step 124).

Positions of the window glass, such as the upper limit position of the catching detection range, the completely closed position of the window (the window top end stop position) and the completely open position of the window (the window bottom end stop position), can be known from the counted number of pulses. The load applied to the window glass due to catching or the like can be detected by the pulse width or the pulse period increasing beyond a predetermined range (the pulse frequency decreasing below a predetermined range). Because the load is also applied when the window is at a completely open position or at a completely closed position, the complete opening or the complete closure can be also detected on the basis of both the counted number of pulses and the change of the pulse width or period exceeding a predetermined range.

In this way, at the device 30 for detecting position and load, the pulse signals are detected by the pulse plate 42 which rotates together with the shaft 20 and by the sliding contact 48. The rotational position of the motor and the rotational speed thereof are detected on the basis of the detected pulse signals (number of pulses and pulse width). Therefore, without any adverse effects due to the thrust joggle of the armature or the rubber cushion of the deceleration mechanism or the like, the position of movement of the window glass can be accurately detected at all times, and the load applied to the motor (i.e., whether a foreign object is caught between the window glass and the window frame, or whether the window glass has reached a limit of movement) can accurately be detected at all times. Further, because the present invention is not a structure such as that of a conventional motor rotational position detection mechanism in which the catching of a foreign object (a predetermined load) is detected by motor lock current, accurate detection and control are possible even in cases in which the temperature conditions vary.

Figure 7:
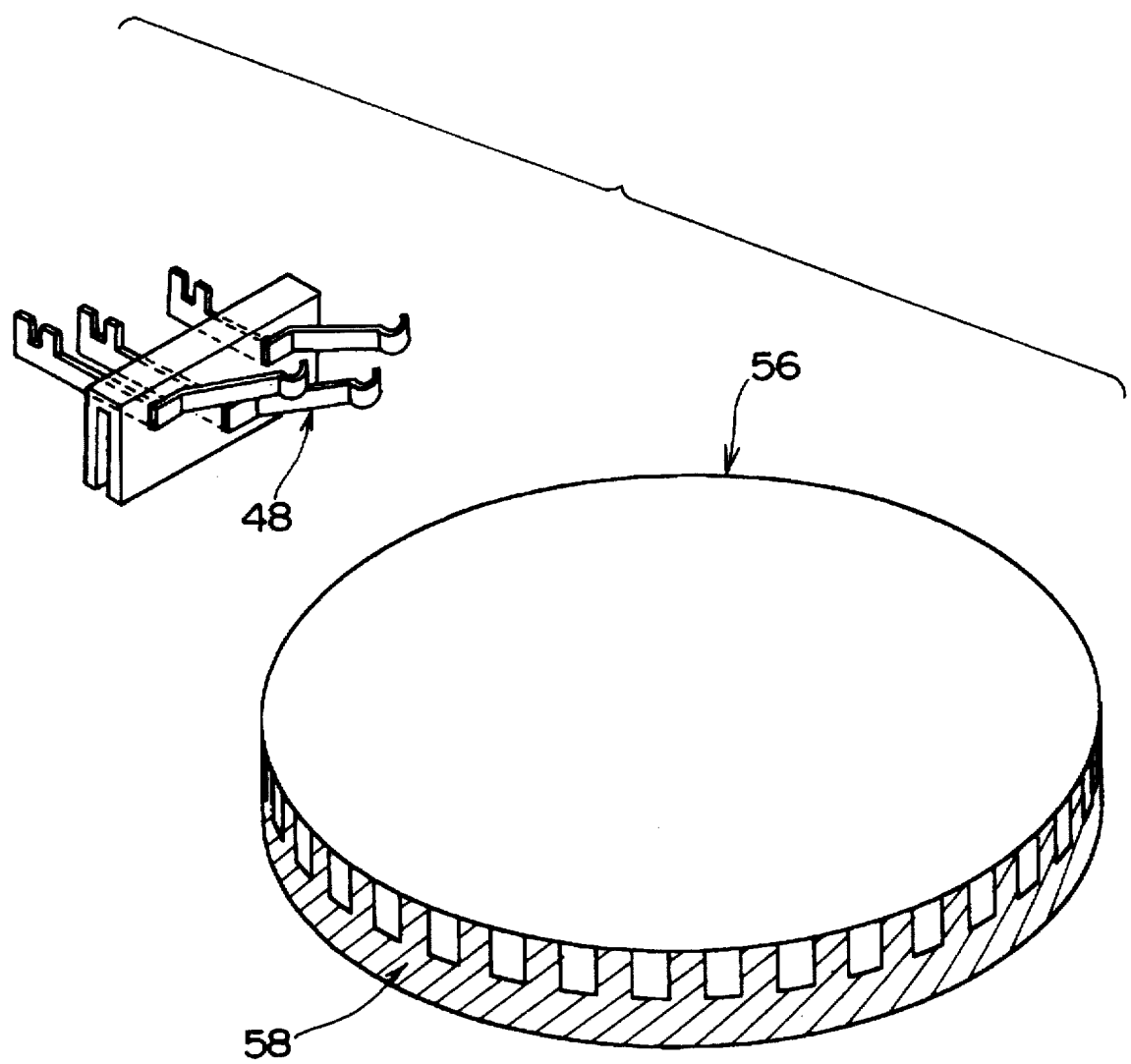
FIG. 7 is a perspective view illustrating another example of a pulse plate of the device for detecting position and load relating to the first embodiment of the present invention.

In the first embodiment, the conductive portion 46 is provided on the upper surface of the pulse plate 42. However, the present invention is not limited to the same. For example, as shown in FIG. 7, a conductive portion 58 may be provided at the peripheral side wall of a pulse plate 56, and the sliding contact 48 may be disposed so as to oppose the conductive portion 58. In this case as well, the rotational position of the motor (i.e., the position of movement of the window glass) and the rotational speed thereof (load; i.e., whether a foreign object has been caught or whether the window glass has reached a limit of movement) can accurately be detected at all times on the basis of the detected pulse signals.

Next, a second embodiment of the present invention will be described. Parts which are the same as those of the first embodiment will be denoted by the same reference numerals, and description thereof will be omitted.

Figure 8:
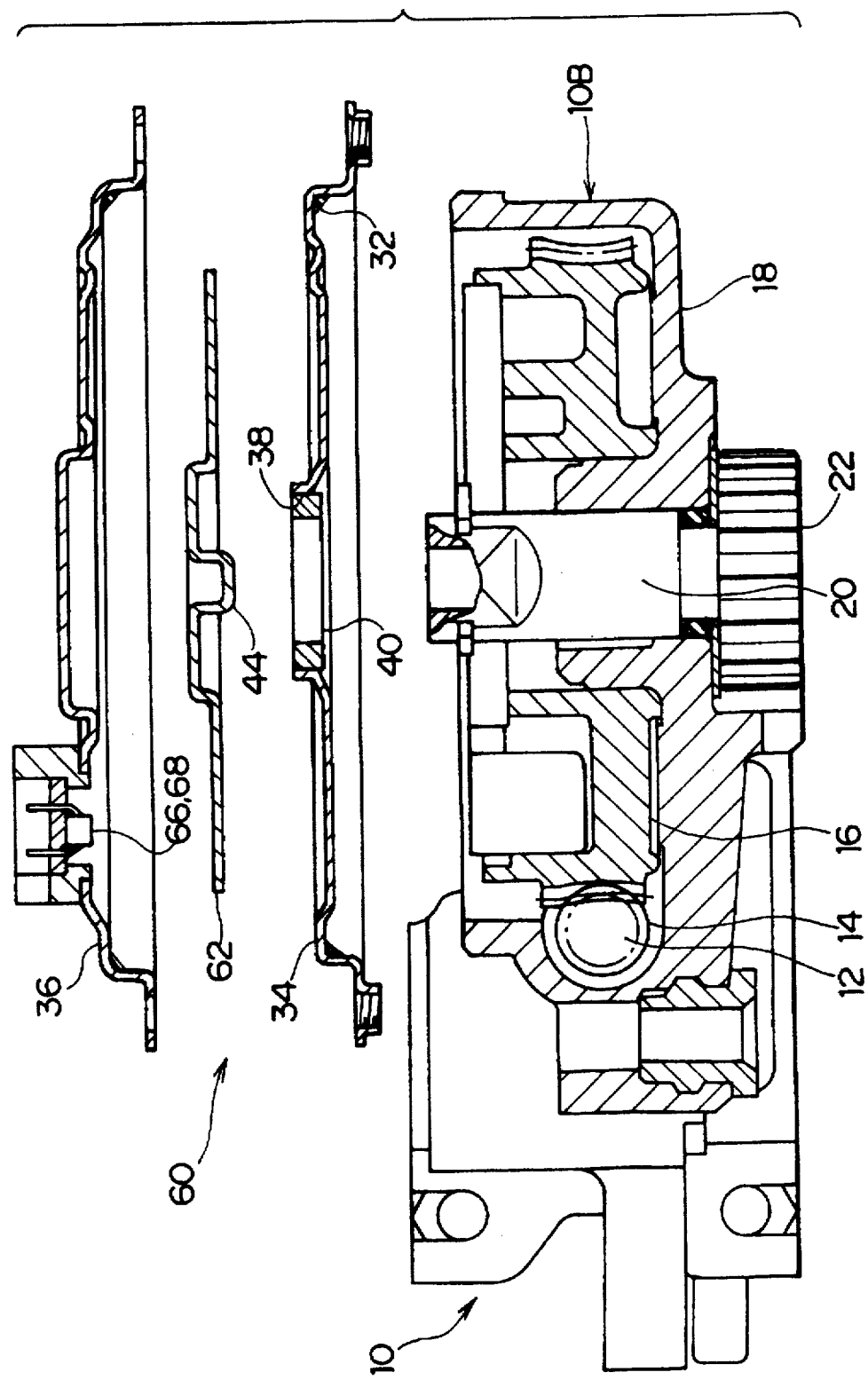
FIG. 8 is an exploded cross-sectional view taken along line 9—9 of FIG. 10 of a motor of a power window apparatus to which a device for detecting position and load relating to a second embodiment of the present invention is applied.
Figure 9:
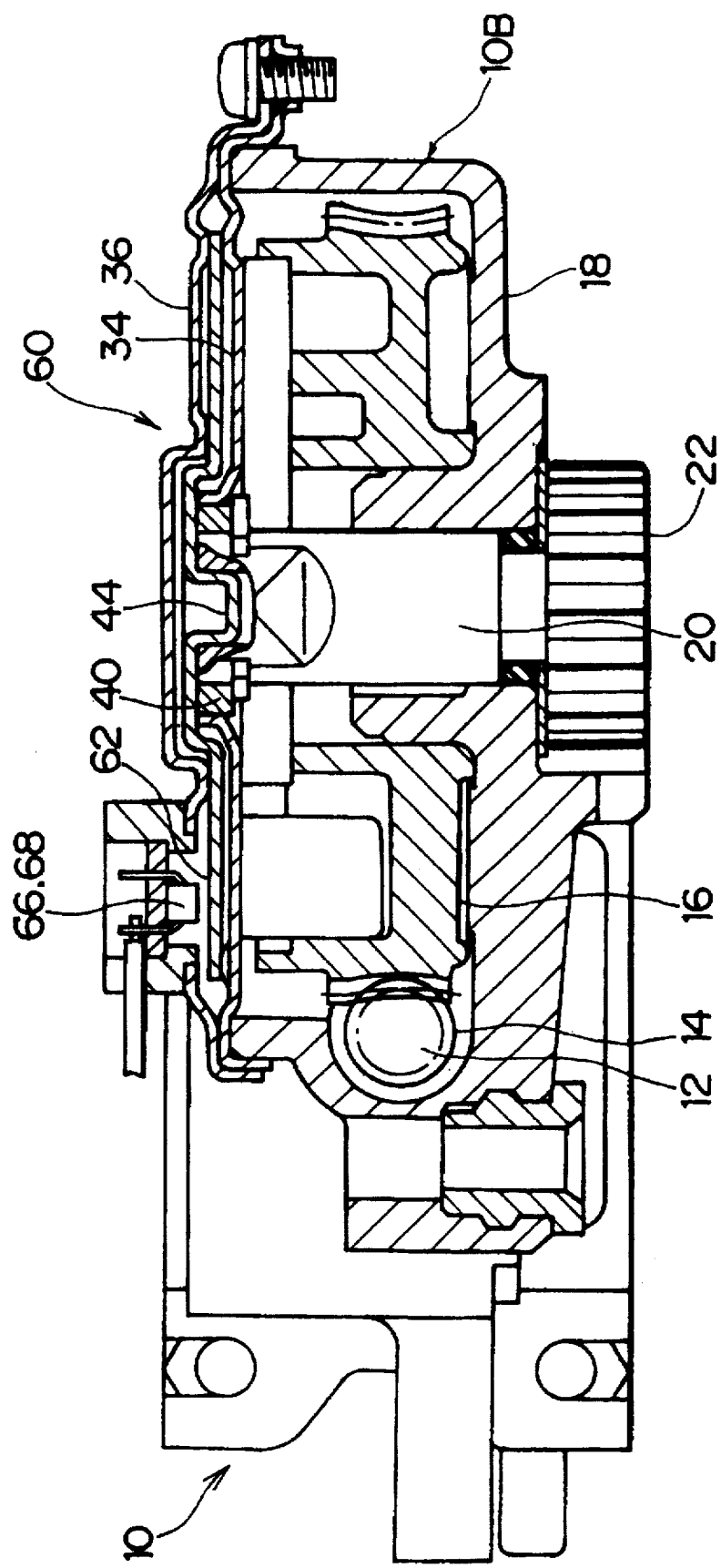
FIG. 9 is a cross-sectional view taken along line 9—9 of FIG. 10 of the motor of the power window apparatus to which the device for detecting position and load relating to the second embodiment of the present invention is applied.
Figure 10:
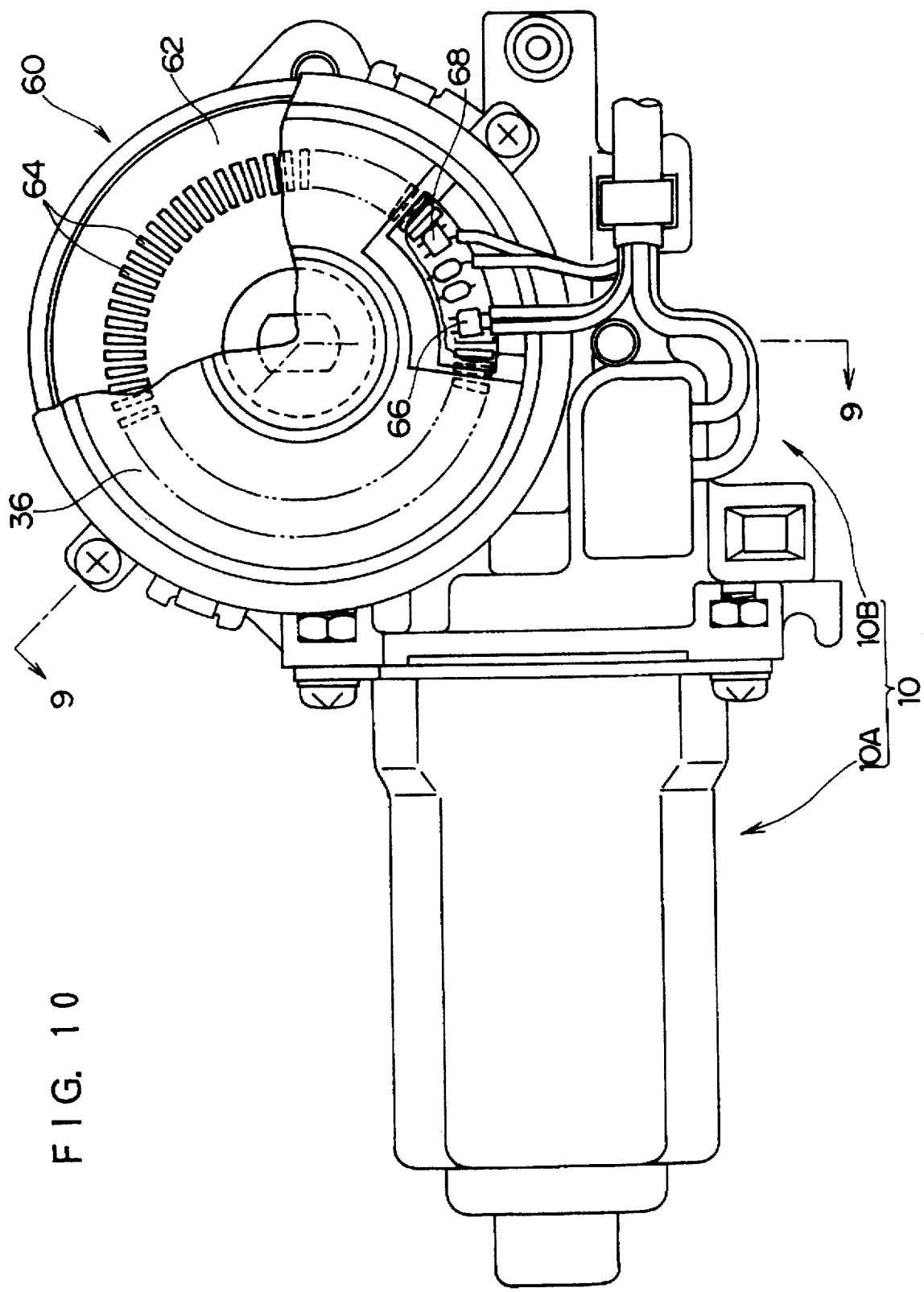
FIG. 10 is a partially-broken plan view of the motor of the power window apparatus to which the device for detecting position and load relating to the second embodiment of the present invention is applied.

FIGS. 8 and 9 are cross-sectional views of a device 60 for detecting position and load relating to a second embodiment of the present invention, and the motor 10 to which the device 60 for detecting position and load is applied. FIG. 10 is a partially-broken plan view of the device 60 for detecting position and load.

Figure 11:
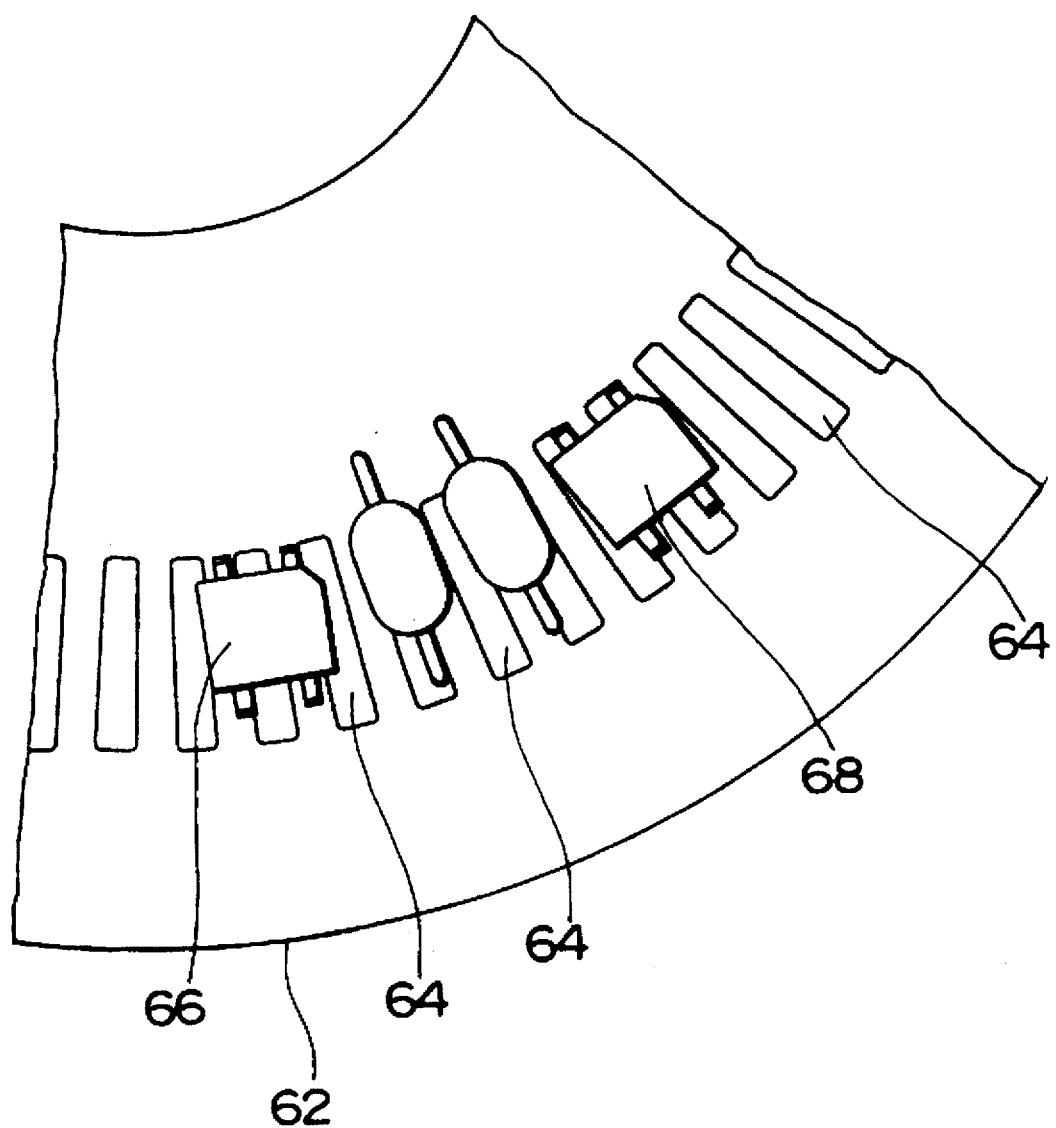
FIG. 11 is a plan view illustrating a corresponding relationship between light reflecting portions and light sensors of the device for detecting position and load relating to the second embodiment of the present invention.

The device 60 for detecting position and load is equipped with a pulse plate 62 which rotates integrally with the shaft 20 and which serves as a pulse generating means. Light reflecting portions 64 are provided at the surface of the pulse plate 62 at the cover plate 36 side thereof. As illustrated in detail in FIG. 11, the light reflecting portions 64 are provided at the central portion of the pulse plate 62 continuously along the peripheral direction at predetermined intervals.

Light sensors 66, 68 serving as a pulse detecting means are provided at the cover plate 36. The light sensors 66, 68 are disposed so as to oppose the light reflecting portions 64 of the pulse plate 62, and detect the reflected light illuminated to the light reflecting portions 64. In this way, as the pulse plate 62 rotates, the light sensors 66, 68 respectively detect a series of pulse signals.

In this case, the positions at which the light sensor 66 and the light sensor 68 oppose the light reflecting portions 64 are set to be offset from each other such that the phase between the pulse signal obtained by the light sensor 66 and the pulse signal obtained by the light sensor 68 is offset by ¼ of a cycle, in the same way as in the first embodiment. In this way, the rotational direction (forward rotation or reverse rotation) of the pulse plate 62 (i.e., the shaft 20) can be detected.

The light sensors 66, 68 are electrically connected, in the same way as described previously, to the control circuit 55 of the power window apparatus, and are used for rotational control of the motor 10.

In the motor 10 and the device 60 for detecting position and load which are structured as described above, the pulse plate 62 rotates as the shaft 20 rotates, and a series of pulse signals is detected by the light sensor 66 and the light sensor 68. On the basis of the detected pulse signals (number of pulses and pulse width), a predetermined rotational position of the motor 10 is determined (i.e., it is determined whether the window glass has reached a predetermined position), and a predetermined load of the motor 10 is determined (i.e., it is determined whether a foreign object has been caught or whether the window glass has been completely closed).

Accordingly, without any adverse effects from the thrust joggle of the armature or a rubber cushion of the deceleration mechanism or the like, the position of movement of the window glass can be accurately detected at all times, and the load applied to the motor (i.e., whether a foreign object has become caught between the window glass and the window frame, or whether the window glass has reached a limit of movement) can be accurately detected at all times. Moreover, because the present invention is not a structure such as that of a conventional motor rotational position detecting mechanism which detects the catching of a foreign object (a predetermined load) by motor lock current, accurate detection and control are possible even in a case in which the temperature conditions fluctuate.

Further, in the device 60 for detecting position and load, the rotational position can be detected with the pulse plate 62 and the light sensors 66, 68 being in a non-contacting state.

Therefore, there is no fluctuation in the pulse waveform due to abrasion or the like, and detection can be effected even more precisely.

Figure 12:
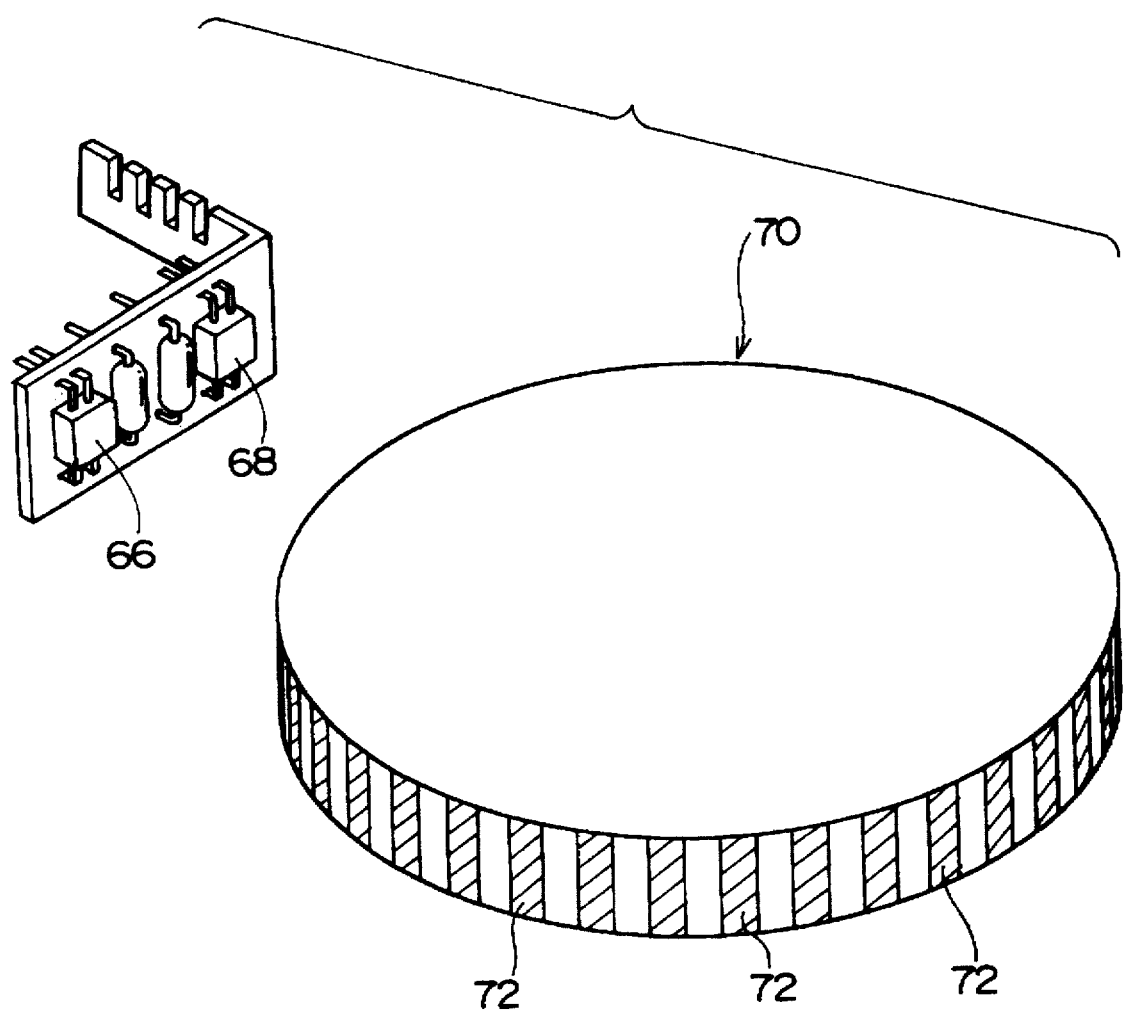
FIG. 12 is a perspective view illustrating another example of a pulse plate of the device for detecting position and load relating to the second embodiment of the present invention.

In the second embodiment, the light reflecting portions 64 are provided on the top surface of the pulse plate 62. However, the present invention is not limited to the same. As illustrated in FIG. 12, light reflecting portions 72 may be provided on the peripheral side wall of a pulse plate 70, and the light sensors 66, 68 may be disposed so as to oppose the light reflecting portions 72. In this case as well, on the basis of the detected pulse signals, the rotational position of the motor (i.e., the position of movement of the window glass) and the rotational speed thereof (load; i.e., whether a foreign object is caught between the window glass and the window frame, or whether the window glass has reached a limit of movement) can be accurately detected at all times.

The above-described present invention has excellent effects in that a predetermined position of movement of a moving object such as a motor output shaft or the like can be detected with a high degree of accuracy, the position of a window glass or a sunroof and the load of the motor can be detected with high accuracy when the present invention is used in a power window apparatus or a sunroof apparatus, and these effects can be realized by a simple structure and at a low cost.

While the embodiments of the present invention as herein disclosed constitute preferred forms of the invention, it is to be understood that other forms might be adopted.

What is claimed is:

1. A device for detecting position and load of a moving object, for detecting a position of movement of a moving object which moves in forward and reverse directions and for detecting a load applied to the moving object, said device comprising:

a pulse generator operatively connected to the moving object for always generating pulses in connection with movement of the moving object;

a pulse detector for detecting the pulses generated by said pulse generator;

a position detector for detecting the position of movement of the moving object based on a number of the pulses detected by the pulse detector; and a load detector for detecting the load applied to the moving object based on a pulse width, a pulse period and a pulse frequency of the pulses detected by said pulse detector.

2. A device for detecting position and load of a moving object according to claim 1, wherein the moving object is an output shaft of a motor which rotates in forward and reverse directions, and said pulse generator is a disk-shaped pulse plate which rotates together with the output shaft and at which a conductive portion having continuous recesses and protrusions at predetermined intervals is provided, and said pulse detector is a sliding contact which is disposed so as to correspond to the conductive portion of the pulse plate and which contacts the conductive portion.

3. A device for detecting position and load of a moving object according to claim 2, wherein said conductive portion includes a first conductive portion provided at the pulse plate, and a second conductive portion adjacent to the first conductive portion and at which pulse-shaped recesses and protrusions are continuous, and the sliding contact includes an input contact plate that elastically abuts the first conductive portion and always contacts the first conductive portion and supplies electricity to the first conductive portion, and a pair of output contact plates that elastically abut the second conductive portion and intermittently contact the second conductive portion and which, as the pulse plate rotates, receive the electricity supplied to the input contact plate and output pulses to said control circuit.

4. A device for detecting position and load of a moving object according to claim 3, wherein a position of contact of one of the pair of output contact plates with the second conductive portion is offset from a position of contact of the other of the pair of output contact plates with the second conductive portion, so that the pulses are output at a phase difference which is other than in-phase and ½ of a cycle.

5. A device for detecting position and load of a moving object according to claim 3, wherein the first conductive portion is provided in a ring shape at a central portion of a surface of the pulse plate, and the second conductive portion is provided so as to be adjacent to an outer periphery of the first conductive portion.

6. A device for detecting position and load of a moving object according to claim 3, wherein the first conductive portion and the second conductive portion are provided at a peripheral side wall of the pulse plate.

7. A device for detecting position and load of a moving object according to claim 1, wherein the moving object is an output shaft of a motor which rotates in forward and reverse directions, and said pulse generator is a disk-shaped pulse plate which rotates together with the output shaft and at which light reflecting portions are provided continuously at predetermined intervals, and said pulse detector is a light sensor which is disposed so as to correspond to the light reflecting portions of the pulse plate and which detects light reflected from the light reflecting portions.

8. A device for detecting position and load of a moving object according to claim 7, wherein a pair of the light sensors are provided, and a position at which one of the pair of light sensors opposes the light reflecting portions is offset from a position at which the other of the pair of light sensors opposes the light reflecting portions so that pulses are output at a phase difference which is other than in-phase and ½ of a cycle.

9. A device for detecting position and load of a moving object according to claim 7, wherein the light reflecting portions are provided at a central portion of a surface of the pulse plate.

10. A device for detecting position and load of a moving object according to claim 7, wherein the light reflecting portions are provided at a peripheral side wall of the pulse plate.

11. A device for detecting position and load of a moving object, for detecting a position of movement of a moving object which moves in forward and reverse directions and for detecting a load applied to the moving object, said device comprising:

a pulse generator connected to the moving object and always generating pulses in connection with movement of the moving object;

a pulse detector detecting the pulses generated by said pulse generator; and a control circuit detecting, on the basis of a number of pulses generated by said pulse generator, the position of movement of the moving object, and detecting, on the basis of a pulse width of the pulses generated by said pulse generator, the load applied to the moving object.

12. A device for detecting position and load of a moving object according to claim 11, wherein the moving object is an output shaft of a motor which rotates in forward and reverse directions, and said pulse generator is a disk-shaped pulse plate which rotates together with the output shaft and at which recessed and protruded pulse generating portions are provided continuously at predetermined intervals, and said pulse detector is disposed so as to oppose the pulse generating portions of the pulse plate and detects the pulses of the pulse generating portions.

13. A device for detecting position and load of a moving object according to claim 12, wherein the pulse generating portions are conductive portions, and said pulse detector is a sliding contact which is disposed so as to correspond to the conductive portions and which contacts the conductive portions.

14. A device for detecting position and load of a moving object according to claim 12, wherein the pulse generating portions are light reflecting portions, and said pulse detector is a light sensor which is disposed so as to correspond to the light reflecting portions and which detects light reflected from the light reflecting portions.

15. A device for detecting position and load of a moving object according to claim 12, wherein the pulse generating portions are provided at a surface of the pulse plate.

16. A device for detecting position and load of a moving object according to claim 12, wherein the pulse generating portions are provided at a peripheral side wall of the pulse plate.

17. A device for detecting position and load of a moving object for detecting a position of movement of a moving object connected to an output shaft of a motor which rotates in forward and reverse directions and for detecting load applied to the moving object, said device comprising:
- a disk-shaped pulse plate at which recessed and protruded pulse generating portions are provided consecutively at predetermined intervals, said pulse plate being connected to the output shaft and operatively connected to rotate together with the output shaft and generate pulses;
- a pulse detector disposed so as to correspond to the pulse generating portions of said pulse plate, for detecting pulses generated by the pulse generating portions as the output shaft rotates; and
- a control circuit for detecting the position of movement of the moving object based on a number of pulses detected by said pulse detector, and for detecting the load applied to the moving object based on a pulse width of the pulses detected by said pulse detector.

18. A device for detecting position and load of a moving object according to claim 17, wherein the pulse generating portions are conductive portions, and said pulse detector is a sliding contact which is disposed so as to correspond to the conductive portions and contacts the conductive portions.

19. A device for detecting position and load of a moving object according to claim 17, wherein the pulse generating portions are light reflecting portions, and said pulse detector is a light sensor which is disposed so as to correspond to the light reflecting portions and which detects light reflected from the light reflecting portions.

20. A device for detecting position and load of a moving object, for detecting a position of movement of a moving object which moves in forward and reverse directions and for detecting a load applied to the moving object, said device comprising:
- a pulse generating means connected to the moving object for always generating pulses in connection with movement of the moving object;
- a pulse detecting means for detecting the position of movement of the moving object based on a number of the pulses detected by the pulse detecting means; and
- a load detecting means for detecting the load applied to the moving object based on a change in the pulses detected by said pulse detecting means.

21. A power window apparatus having a load detecting means for detecting a load applied to a window which moves in forward and reverse directions, said apparatus comprising:
- a reduction gear portion contained in a housing for reducing rotation of a motor to transmit power to the window;
- a pulse generating means for receiving torque through a shaft from said reduction gear portion and for rotating therewith;
- a pulse detecting means mounted to a cover plate covering an opening portion of the housing for detecting the pulses generated by said pulse generating means;
- a load detecting means for detecting the load applied to the window based on the pulses detected by said pulse detecting means; and
- a partitioning means having a through-hole of the shaft transmitting torque from said reduction gear portion to said pulse generating means for partitioning said pulse generating means and said reduction gear portion.

22. A power window apparatus having means for detecting position and load of a window, for detecting a position of movement of the window which moves in forward and reverse directions and for detecting a load applied to the window, said apparatus comprising:
- a reduction gear portion contained in a housing for reducing rotation of a motor to transmit power to the window;
- a pulse generating means for receiving torque through a shaft from said reduction gear portion and for rotating therewith;
- a pulse detecting means mounted to a cover plate covering an opening portion of the housing for detecting the pulses generated by said pulse generating means;
- a control circuit for detecting, based on the pulses detected by said pulse detecting means, the position of movement of the window and the load applied to the window; and
- a partitioning means having a through-hole of the shaft transmitting torque from said reduction gear portion to said pulse generating means for partitioning said pulse generating means and said reduction gear portion.

23. A power window apparatus having means for detecting position and load of a window, for detecting a position of movement of the window which moves in forward and reverse directions and for detecting a load applied to the window, said apparatus comprising:
- a reduction gear portion contained in a housing for reducing rotation of a motor to transmit power to the window;
- a pulse generating means for receiving torque through a shaft from said reduction gear portion and for rotating therewith;
- a pulse detecting means mounted to a cover plate covering an opening portion of the housing for detecting the pulses generated by said pulse generating means; and
- a control circuit for detecting, based on the pulses detected by said pulse detecting means, the position of movement of the window and the load applied to the window, wherein
- said pulse generating means is mounted via a base plate which has a through-hole of the shaft transmitting torque from said reduction gear portion to said pulse generating means and which covers the opening portion of the housing.

* * * * *